United States Patent [19]

English

[11] Patent Number: 5,023,154
[45] Date of Patent: Jun. 11, 1991

[54] BATTERY TERMINAL PROTECTOR

[75] Inventor: James H. English, Anderson, Ind.

[73] Assignee: General Motors Corproation, Detroit, Mich.

[21] Appl. No.: 575,755

[22] Filed: Aug. 31, 1990

[51] Int. Cl.⁵ ............................................ H01M 2/30
[52] U.S. Cl. ..................................... 429/182; 429/65
[58] Field of Search ................. 429/182, 65, 121, 122; 174/138 F, 188; 439/522

[56] References Cited

U.S. PATENT DOCUMENTS

| 2,564,810 | 8/1951 | Martin et al. | 429/65 X |
| 3,884,725 | 5/1975 | Schmidt | 429/65 |
| 3,956,576 | 5/1976 | Jensene et al. | 429/65 |
| 4,761,354 | 8/1988 | Poe et al. | 429/65 X |
| 4,920,018 | 4/1990 | Turner | 429/65 |

FOREIGN PATENT DOCUMENTS 0111762 10/1940 Australia ............................... 429/65

Primary Examiner—Anthony Skapars
Attorney, Agent, or Firm—Lawrence B. Plant

[57] ABSTRACT

A battery terminal having a terminal post axially offset from where the terminal electrically connects to the innards of the battery including means for preventing twisting or lifting of the terminal relative to the battery container. The anti-twist/lift means comprises an aperture through the base of the terminal adjacent the terminal post, and an integral projection on the container wall passing through the aperture and headed over atop the base.

3 Claims, 1 Drawing Sheet

BATTERY TERMINAL PROTECTOR

This invention relates to electric storage batteries and more particularly to storage batteries having terminal posts which are axially offset from the electrical connectors which join the terminals to the battery's innards.

BACKGROUND OF THE INVENTION

Electric storage batteries typically comprise a container housing a number of individual electrochemically active cell elements each comprising alternately spaced positive and negative polarity plates. The positive polarity plates of each cell are typically electrically joined together by means of a positive plate strap. Similarly, the negative polarity plates of each cell element are electrically joined together by a negative plate strap. In series connected batteries, the positive plate strap of one cell element is connected to the negative plate strap of the element in the next adjacent cell compartment through an opening in the partition separating the cell compartments. In the end cells of the battery, a connector electrically connects the appropriate plate strap to a battery terminal on the outside of the container by passing through an aperture in a container wall (e.g., through the cover).

In some batteries the terminal on the outside of the battery is formed directly atop the connector extending from within the battery's innards and hence is in axial alignment with the connector. In other batteries, however, the battery terminal includes a post which is axially offset from the cell element connector and is electrically linked thereto via a base portion of the terminal. Batteries having offset terminals are more susceptible to terminal damage than are those where the terminals are in axial alignment with their respective cell element connectors. In this regard, axially offsetting the terminal post from the connector and linking it to the connector by an elongated base portion of the terminal permits the elongated base portion to act like a lever which multiplies any force applied to the terminal post and focuses it at the junction between the cell element connector and the base portion of the terminal. For example, a force applied to the terminal post parallel to the top of the battery (e.g., see the arrows in FIG. 1) can twist and break the connector while any force applied axially to the terminal post (i.e., normal to the top of the battery), such as occurs by lifting the battery by its terminals, can cause the terminal to be lifted away from the top of the container and break the terminal. This breakage problem typically occurs when users carry the battery using devices designed to engage the battery terminals. While such carrying devices are effective in carrying batteries whose terminals are axially aligned with the connector joining the terminals to the battery's innards, they are not recommended for batteries having offset terminal posts and indeed can cause serious damage to a battery when used therewith. Such carriers typically include a handle and means at either end of the handle to grasp the terminal post. When such devices are used, the full weight of the battery is carried by the two posts and is focused on the base portion of the terminal which connects the terminal posts to the connector to the innards of the battery.

Some manufacturers have attempted to eliminate the terminal twisting and lifting problem by containing the offset terminal within a pocket molded into an intermediate cover, staking the terminal post end of the terminal to a wall forming the pocket and positioning a final cover over the intermediate cover which completely buries the base of the terminal within the cover leaving only the terminal post protruding above the cover.

It is an object of the present invention to provide an improved means for anchoring an offset terminal to the battery container as to substantially prevent damage to the terminal resulting from rotation and/or lifting of the terminal relative to the battery container. This and other objects and advantages of the present invention will become more readily apparent from the following description thereof which is given hereafter in conjunction with the several drawings in which.

SUMMARY OF THE INVENTION

The present invention comprehends an electric storage battery having a container with a cell element therein connected to an external axially offset terminal by means of a connector extending through an opening in an upper wall of the container. The terminal includes a base portion which lies contiguous the upper surface of the container wall and, at one end, is joined to the cell element connector and, at the other end has an upstanding post axially offset from the connector for connecting the battery to an external electrical load (e.g., cranking system of a vehicle). The present invention prevents damage to the terminal of the type discussed above and includes: an aperture through the base of the terminal adjacent the post; a projection integral with the container wall and extending through the aperture; and a cap secured onto the distal end of the projection and engaging the upper surface of the base surrounding the aperture. The cap will preferably comprise a deformed (e.g., headed over) portion of the distal end of the projection extending through the aperture. The shank of the projection engaging the aperture prevents rotation of the terminal about the axis of the internal connector while the cap atop the projection prevents lifting of the terminal away from the upper wall.

DETAILED DESCRIPTION OF CERTAIN SPECIFIC EMBODIMENTS OF THE PRESENT INVENTION

Figure 1:
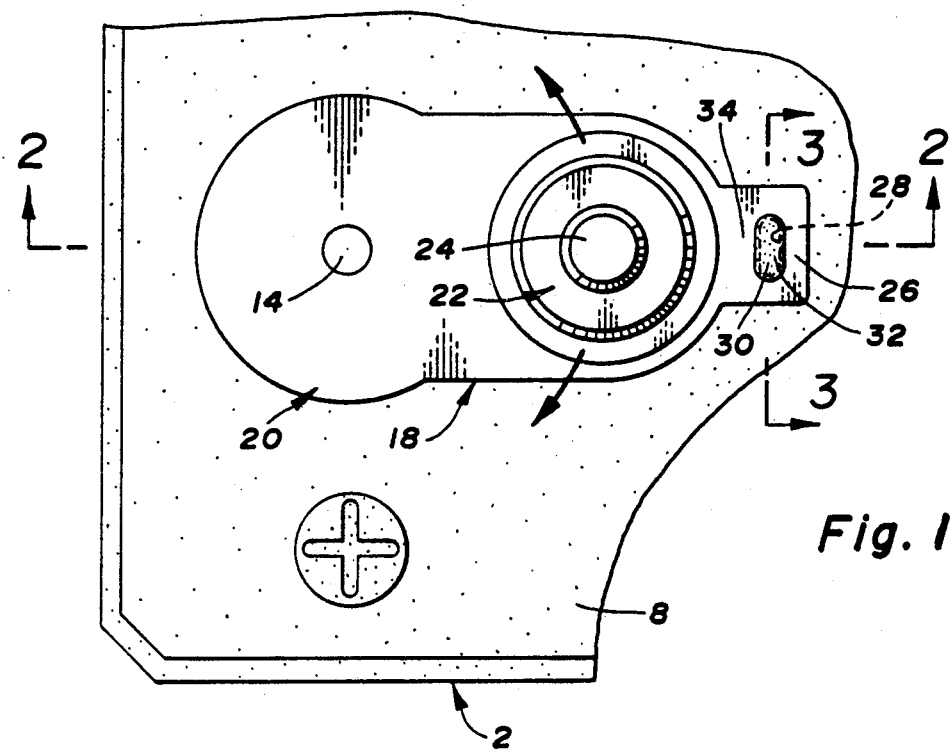
FIG. 1 is a partial plan view of a battery showing an offset terminal in accordance with the present invention.
Figure 3:
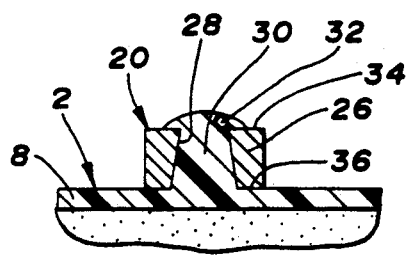
FIG. 3 is a view in the direction 3—3 of FIG. 1.
Figure 2:
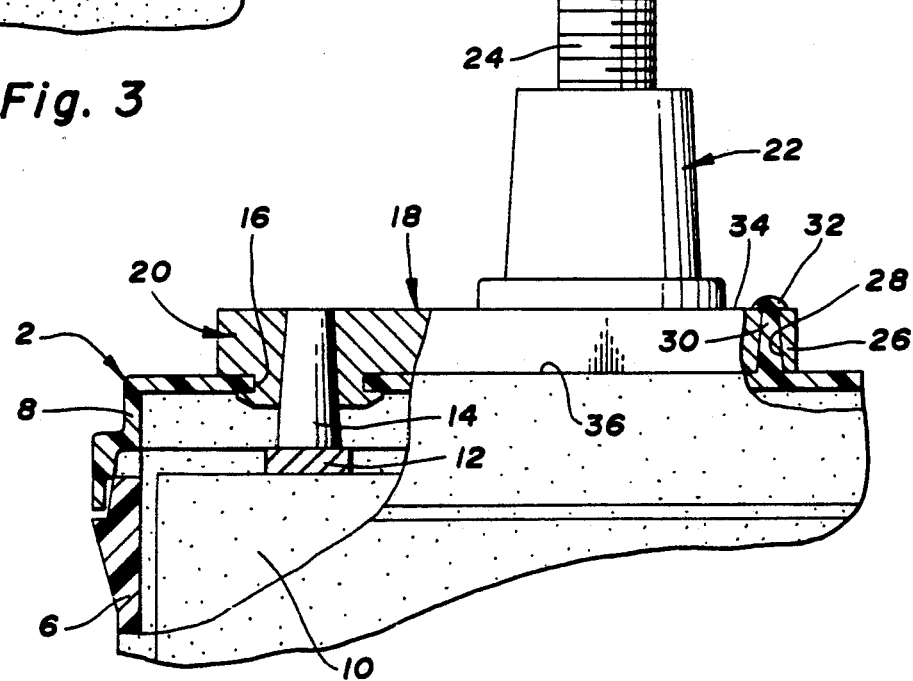
FIG. 2 is a view in the direction 2—2 of FIG. 1.

The Figures depict a battery 2 having a container comprising a case portion 6 and a cover portion 8. The container houses an electrochemical cell element 10 comprising a plurality of alternately spaced positive and negative polarity plates. All the plates of like polarity are connected together in the cell element via a plate strap 12 which includes a connector post 14 extending upwardly from the strap 12 through an aperture 16 in the cover 8 and engaging (typically welded to) the battery terminal 18. The terminal 18 includes a base portion 20 which engages the internal connector post 14 at one end and has a terminal post 22 at the other end for connection to the battery's external load. The terminal post 22 may include a threaded stud 24 for receiving an eyelet type cable connector and wing nut (not shown) for securing the cable atop the post. The terminal post 22 is axially offset from the connector 14, but electrically connected thereto via the base portion 20. The base portion 20 includes an ear 26 adjacent the post 22 having an aperture 28 therethrough adapted to receive an upstanding projection 30 formed integrally with the cover 8. The distal portion 32 of the upstanding projection 30 is preferably deformed as by heading over (i.e., mushrooming) with a heated tool so as to form a cap 32 which engages the upper surface 34 of the base 20 surrounding the aperture 28. The shank portion of the projection 30 serves to prevent rotation of the terminal in either of the directions shown by the arrows in FIG. 1 while the cap 32 prevents lifting of the terminal and hence parting of the base 20 from the surface of the cover 8 at the interface 36 therebetween.

While this invention has been described primarily in terms of a specific embodiment thereof it is not intended to be limited thereto but rather only to the extent set forth hereafter in the claims which follow.

The embodiments of the invention in which an exclusive property or privilege is claimed are defined as follows:

1. In an electric storage battery having a container including an upper wall, a cell element in said container, a connector extending from said element through said wall, a terminal contiguous said wall outside said container said terminal having a base engaging said connector and a post extending from an upper surface of said base for connection to an external electrical load, said post being axially offset from said connector, the improvement comprising means for preventing rotation of said terminal about said connector and parting of said terminal from said wall incident to the application of battery carrying forces to said post, said means comprising an aperture through said base adjacent said post, a projection integral with said wall and extending through said aperture, and a cap secured to the distal end of said projection and engaging said upper surface surrounding said aperture.

2. The battery according to claim 1, wherein said cap comprises a deformed portion of said distal end of said projection.

3. The battery according to claim 2 including an ear projecting from said base adjacent said terminal post and said aperture extends through said ear.

* * * * *